US007701450B2

(12) United States Patent
De Greef

(10) Patent No.: US 7,701,450 B2
(45) Date of Patent: Apr. 20, 2010

(54) LINE SCANNING IN A DISPLAY

(75) Inventor: Petrus Maria De Greef, Waalre (NL)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 386 days.

(21) Appl. No.: 10/533,019

(22) PCT Filed: Oct. 22, 2003

(86) PCT No.: PCT/IB03/04688

§ 371 (c)(1),
(2), (4) Date: Apr. 27, 2005

(87) PCT Pub. No.: WO2004/040539

PCT Pub. Date: May 13, 2004

(65) Prior Publication Data

US 2006/0066592 A1 Mar. 30, 2006

(30) Foreign Application Priority Data

Oct. 31, 2002 (EP) ................................. 02102512

(51) Int. Cl.
*G06F 3/038* (2006.01)

(52) U.S. Cl. ...................................................... 345/204

(58) Field of Classification Search .................. 345/60, 345/63, 72, 77, 690, 693, 204; 315/169.3; 313/500; 349/769; 359/242
See application file for complete search history.

(56) References Cited

U.S. PATENT DOCUMENTS 5,844,534 A * 12/1998 Okumura et al. .............. 345/90
5,953,002 A * 9/1999 Hirai et al. .................. 345/204
6,094,243 A 7/2000 Yasunishi
6,144,364 A * 11/2000 Otobe et al. ................ 345/691
6,205,070 B1 3/2001 Seevinck et al.
6,611,261 B1 * 8/2003 Zhang et al. ................ 345/204
6,661,428 B1 * 12/2003 Kim ........................... 345/690
6,924,824 B2 * 8/2005 Adachi et al. ............... 345/690
2002/0105510 A1 * 8/2002 Tsuchiya .................... 345/211

FOREIGN PATENT DOCUMENTS

EP 0 747 903 12/1996

* cited by examiner

*Primary Examiner*—Richard Hjerpe
*Assistant Examiner*—Shaheda A Abdin
(74) *Attorney, Agent, or Firm*—DLA Piper LLP (US)

(57) ABSTRACT

A method of scanning lines in a display, a device for scanning lines and a portable electronic device including such a device scan lines consecutively for a set of scanning cycles and vary the selection of subfield from line to line in each scanning cycle such that subfields are selected in a consecutive order from line to line, no two consecutive line scans use the same subfield and no line is scanned using the same subfield twice during the set of scanning cycles.

14 Claims, 9 Drawing Sheets

LINE SCANNING IN A DISPLAY

The present invention is directed towards a method and a device for scanning lines in a display as well as an electronic device including such a device. More specifically the invention is directed towards selection of luminance information for scanning lines in displays.

Displays are generally driven by using a field associated with each pixel, where the field provides a luminance value that is provided during a frame. In many digitally driven displays, this field is divided into smaller sections or subfields, often in order to be able to provide a finer resolution of luminance information. In some applications the various subfields represent a different quantity of luminance. When such subfields are driven sequentially i.e. first one subfield is driven in a scanning cycle line by line followed by a next subfield line by line until all subfields have been driven within the frame, visual image flicker may occur. This visual image flicker may occur because of the differing lengths of the subfields and the fact that they are driven sequentially at a specific rate. This flicker becomes less visible when the display rate is increased. However, it cannot be increased too much because of the minimum addressing time of the different subfields. Increased display rates also leads to a higher power consumption, which often is not desirable when using the display driving scheme in a portable device.

U.S. Pat. No. 6,094,243 describes two different display driving schemes for a liquid crystal display, pulse width modulation and frame rate control. The document also describes subfields having different lengths. Flicker is in this document avoided by varying the voltage applied from subfield to subfield. The document therefore describes reduction of the subframe periods of the most significant bits through driving them with higher voltages. There is no solution mentioned to the problem of flicker due to the sequential driving of subfields.

There is thus a need for reducing flicker because of luminance artifacts without having to increase the display rate and voltage.

The present invention is therefore directed towards solving the above-mentioned problems associated with flickering caused by subfields without increasing the display rate and voltage.

One object of the present invention is thus to provide a method of scanning lines, which reduces the flickering associated with subfields without raising the display rate and voltage.

According to a first aspect of the present invention, this object is achieved by a method of scanning lines in a display within a frame, where driving luminance information provided to the display for each pixel within the frame is divided into subfields. The method includes the steps of: selecting subfields to be used when scanning lines in a set of scanning cycles equivalent to the number of subfields existing for driving the pixels, scanning the lines consecutively for the set of scanning cycles, and varying the selection of subfield from line to line in each scanning cycle such that no two consecutive line scans use the same subfield and no line is scanned using the same subfield twice during the set of scanning cycles, such that image flicker caused by the subfields is reduced.

Another object of the present invention is to provide a device for scanning a display, which reduces the flickering associated with subfields without raising the display rate and voltage.

According to a second aspect of the present invention, this object is achieved by a device for scanning a number of lines in a display within a frame using luminance values within a frame and comprising: at least one conversion unit for converting received luminance values into driving luminance information including subfields, and supplying the subfields to a line driving unit, a line driving unit arranged to scan each line consecutively with the luminance information of each pixel on the display in a number of scanning cycles equivalent to the number of subfields existing for driving the pixels, and a control unit arranged to provide variation of the selection of subfield from line to line for each scanning cycle such that no two consecutive line scans use the same subfield and no line is scanned using the same subfield twice during the set of scanning cycles, such that image flicker caused by the different sizes of the subfields is reduced.

Yet another object of the present invention is to provide a portable electronic device having a display and which reduces the flickering associated with subfields without raising the display rate.

According to a third aspect of the invention, this object is achieved by a portable electronic device comprising: a display, at least one conversion unit for converting received luminance values into driving luminance information including subfields and supplying the subfields to a line driving unit, a line driving unit arranged to scan each line consecutively with the luminance information of each pixel on the display in a number of scanning cycles equivalent to the number of subfields existing for driving the pixels, and a control unit arranged to provide variation of the selection of subfield from line to line for each scanning cycle such that no two consecutive line scans use the same subfield and no line is scanned using the same subfield twice during the set of scanning cycles, such that image flicker caused by the different sizes of the subfields is reduced.

In some embodiments, subfields are provided in staggered order, i.e. consecutively from line to line within a scanning cycle.

In some embodiments, a complete random selection is made of subfields form line to line.

With the present invention flickering occurring because of artifacts associated with a certain subfield from line to line and because of to the length of a subfield is reduced. Since the display rate and voltage is not raised for accomplishing this, the invention is also power efficient.

The basic idea of the invention is to provide variation of the order subfields are provided to a display from line to line in a consecutive line-scanning scheme.

The expression line used here is intended to comprise lines in any direction on the display and to comprise both rows and columns.

The above mentioned and other aspects of the invention will be apparent from and elucidated with reference to the embodiments described hereinafter.

The present invention will be further described in relation to the accompanying drawings, in which.

Figure 4:
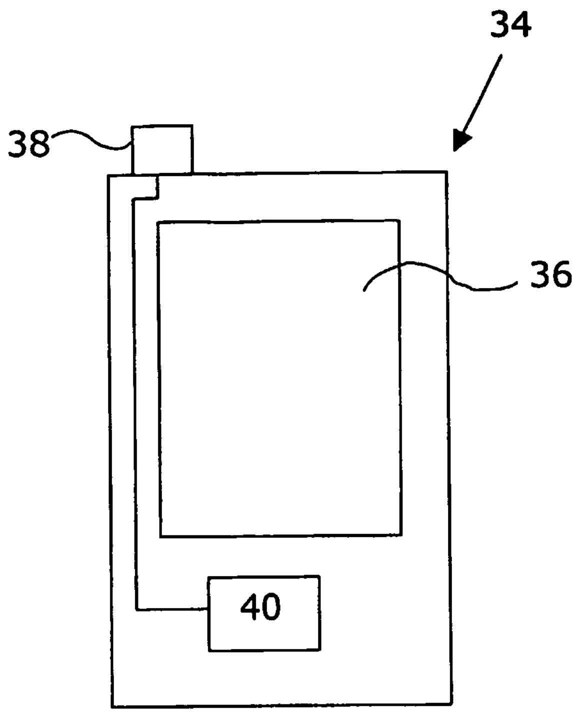
Figure 5:
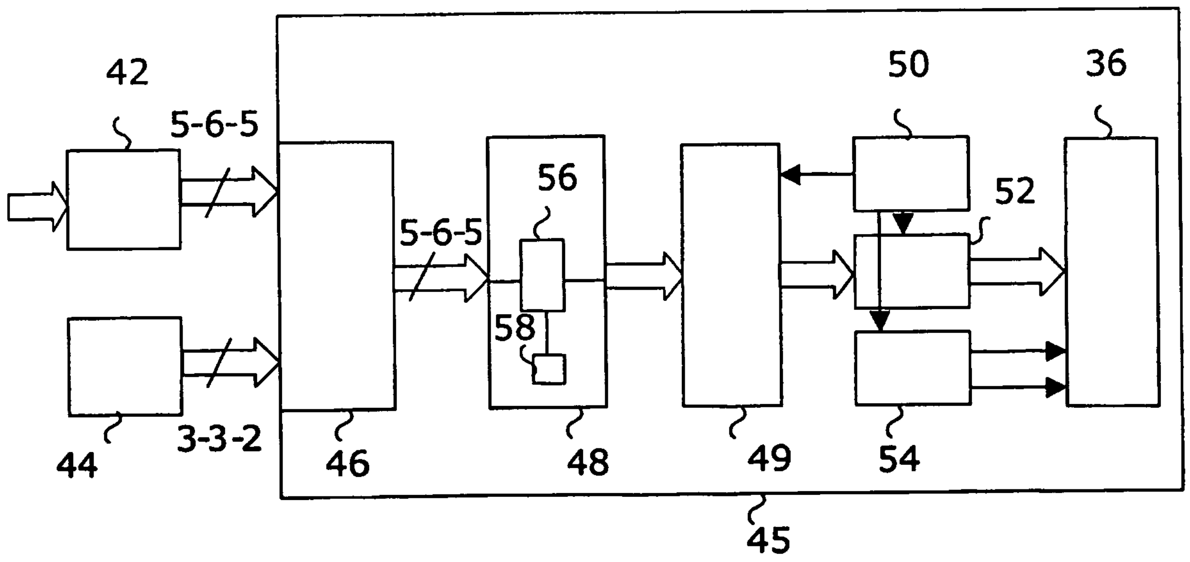
Figure 6:
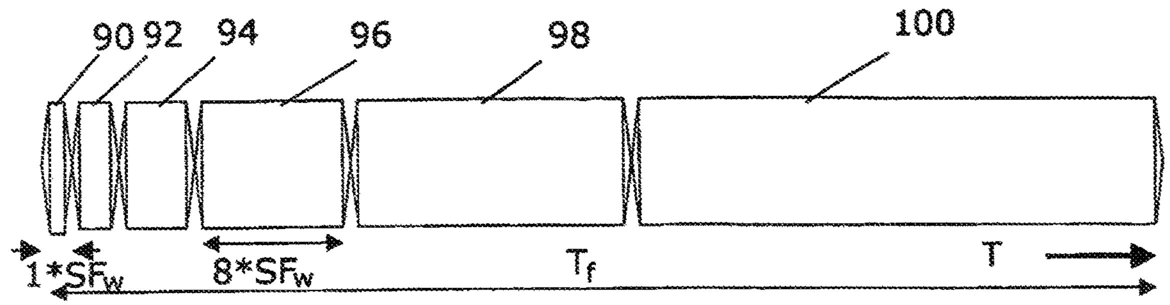
Fig. 6 (Prior Art)
Figure 7:
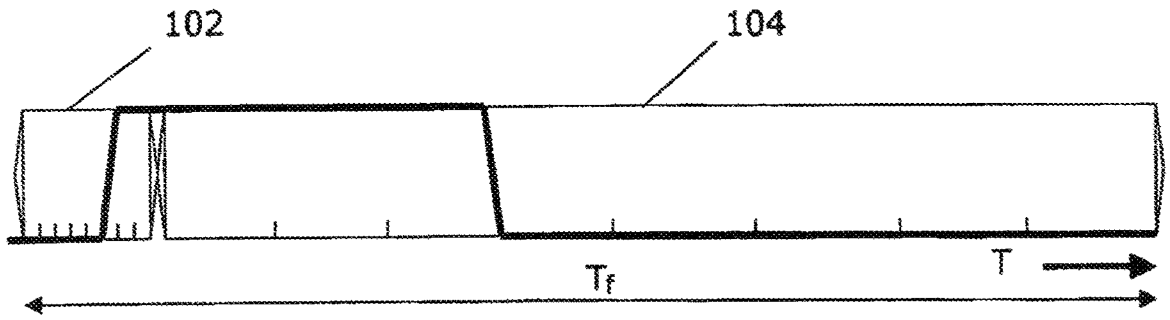
Fig. 7 (Prior Art)
Figure 15:
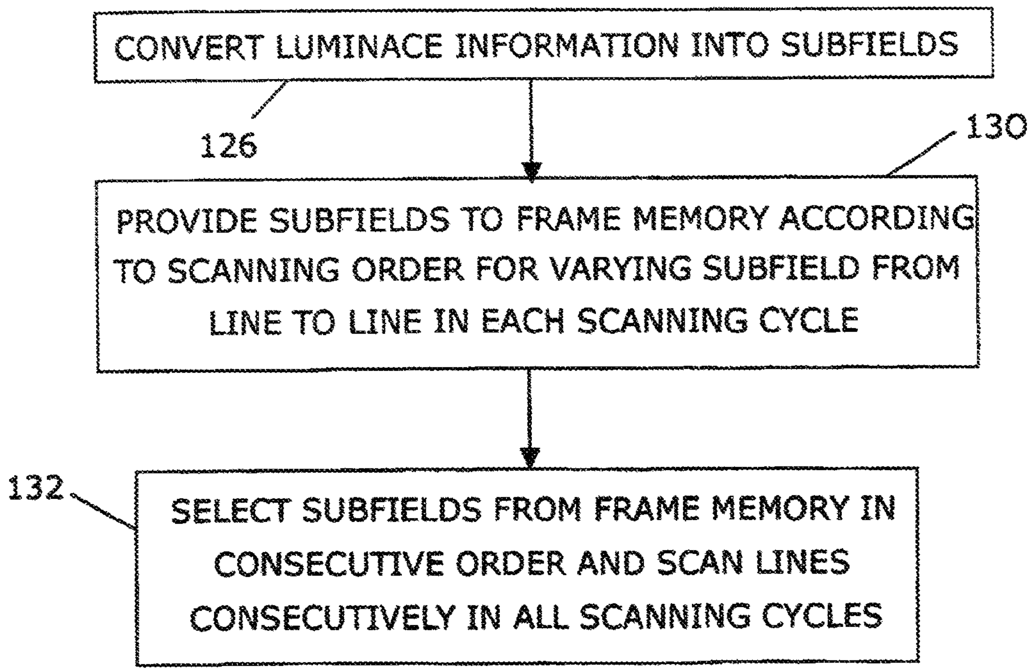
Figure 8:
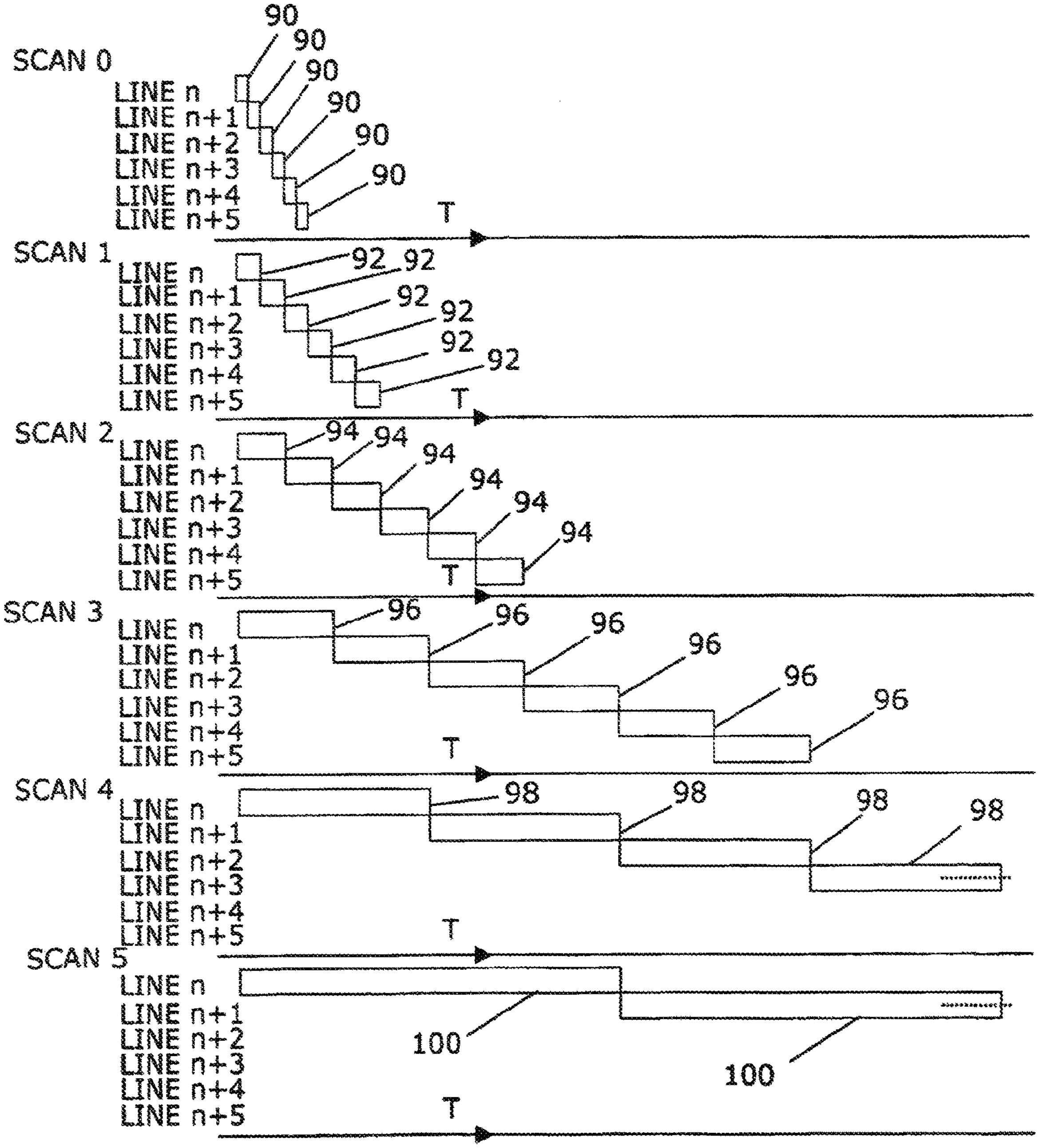
Fig. 8 (Prior Art)
Figure 9:
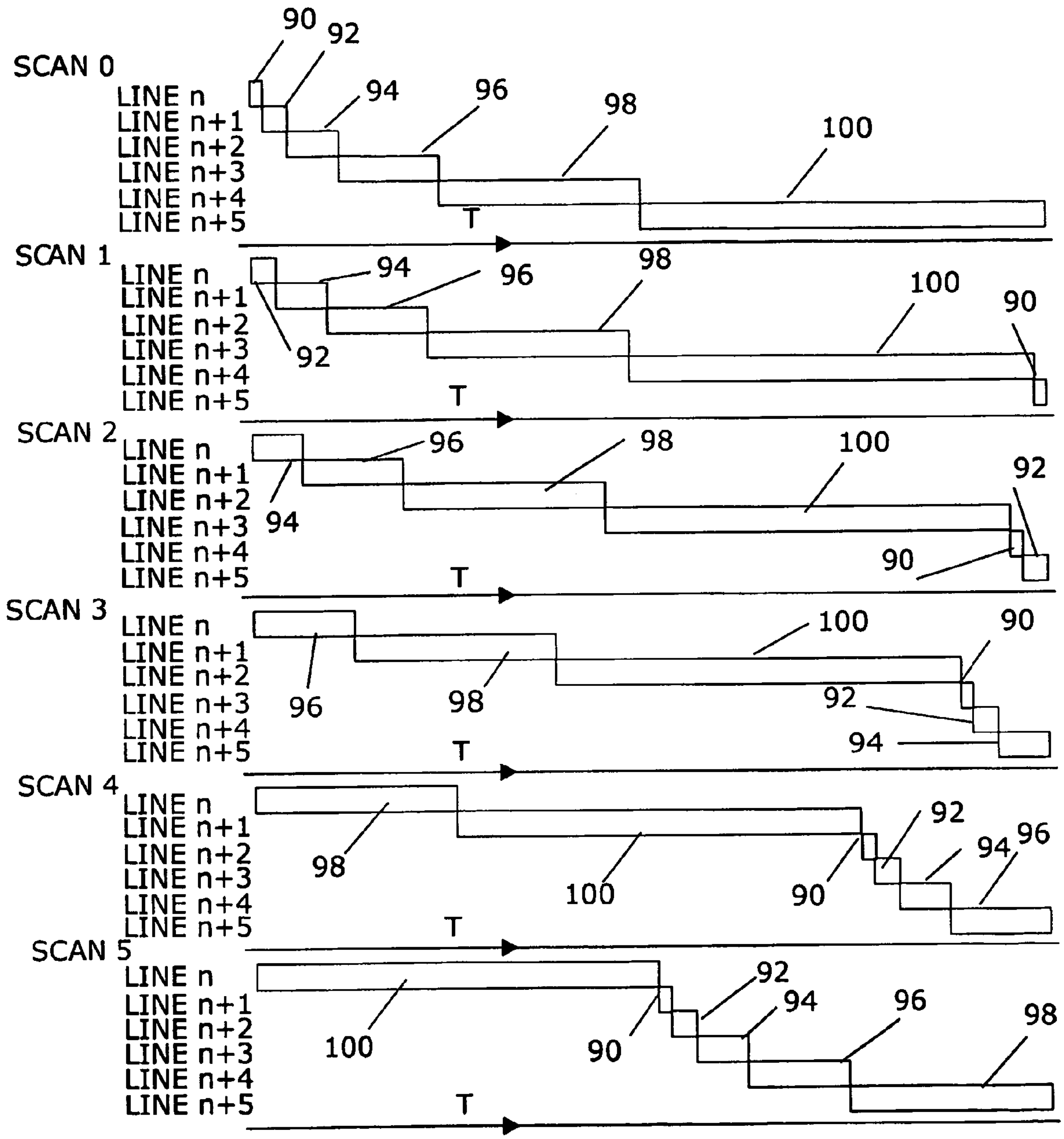
Figure 10:
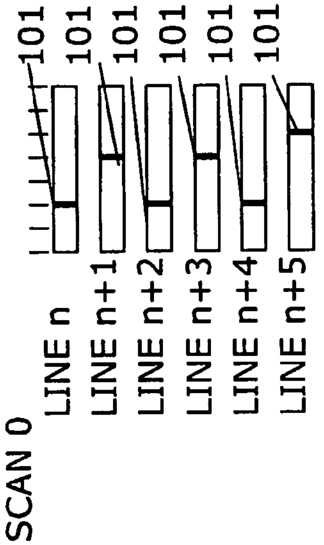
Figure 11:
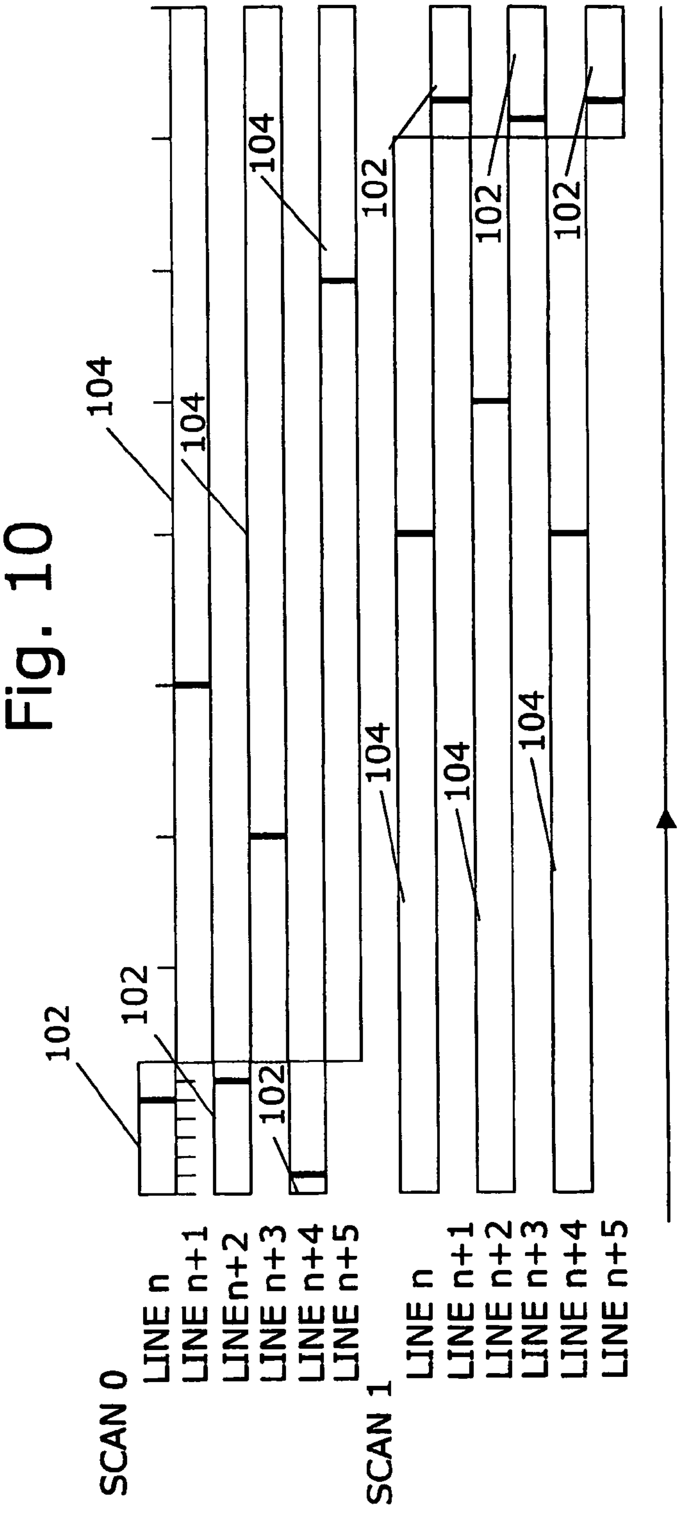
Figure 12:
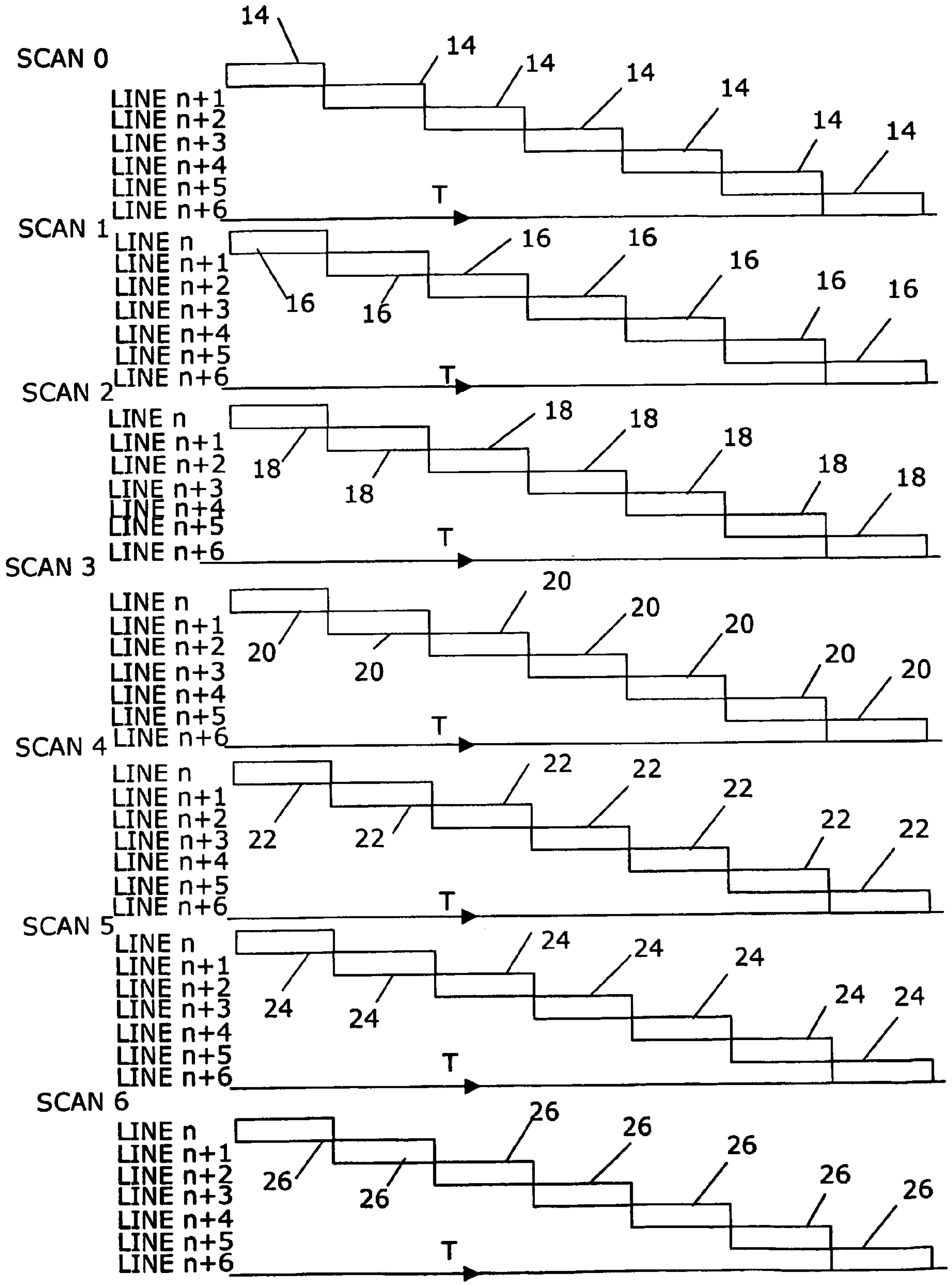
Figure 13:
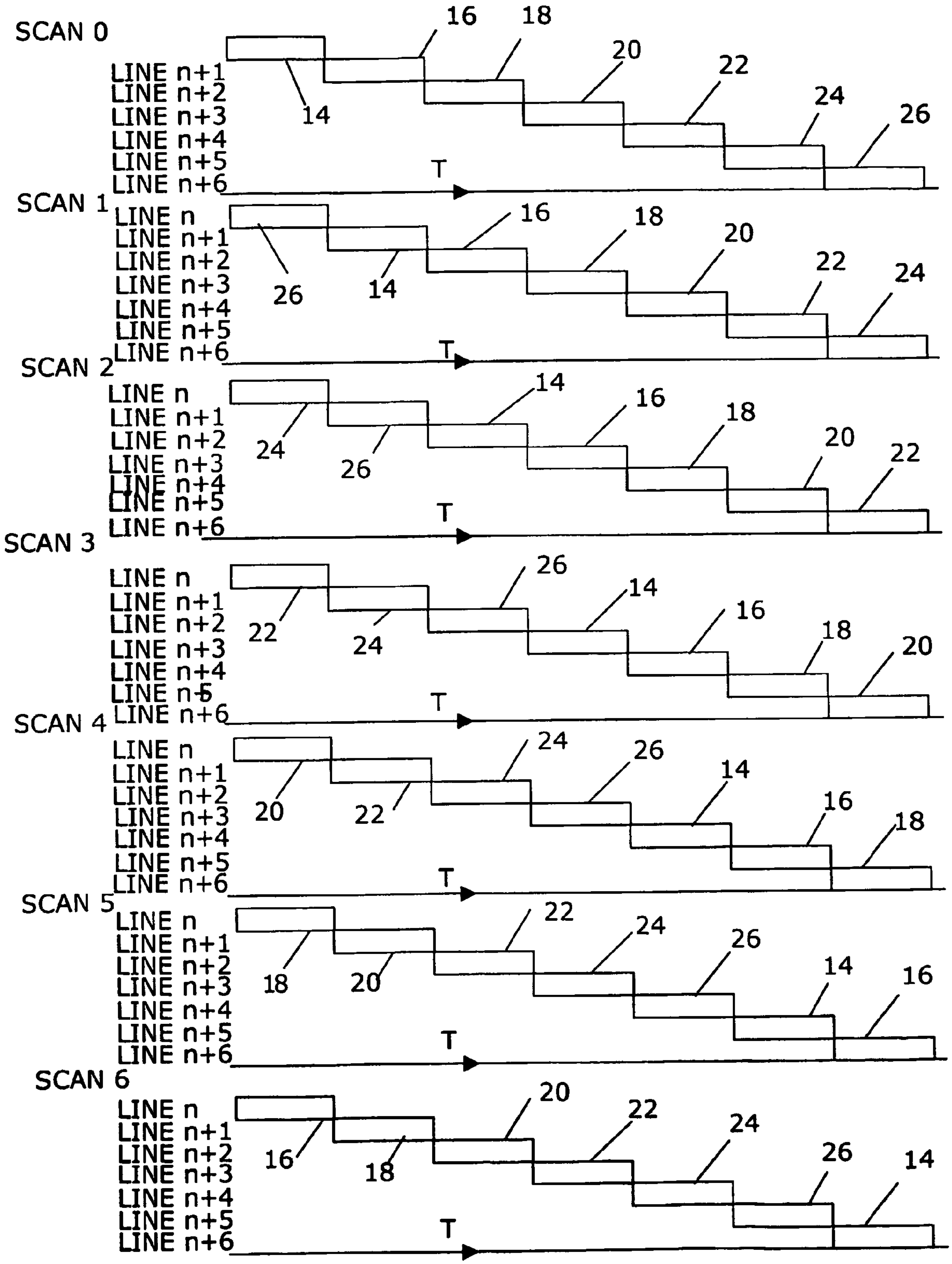
Figure 14:
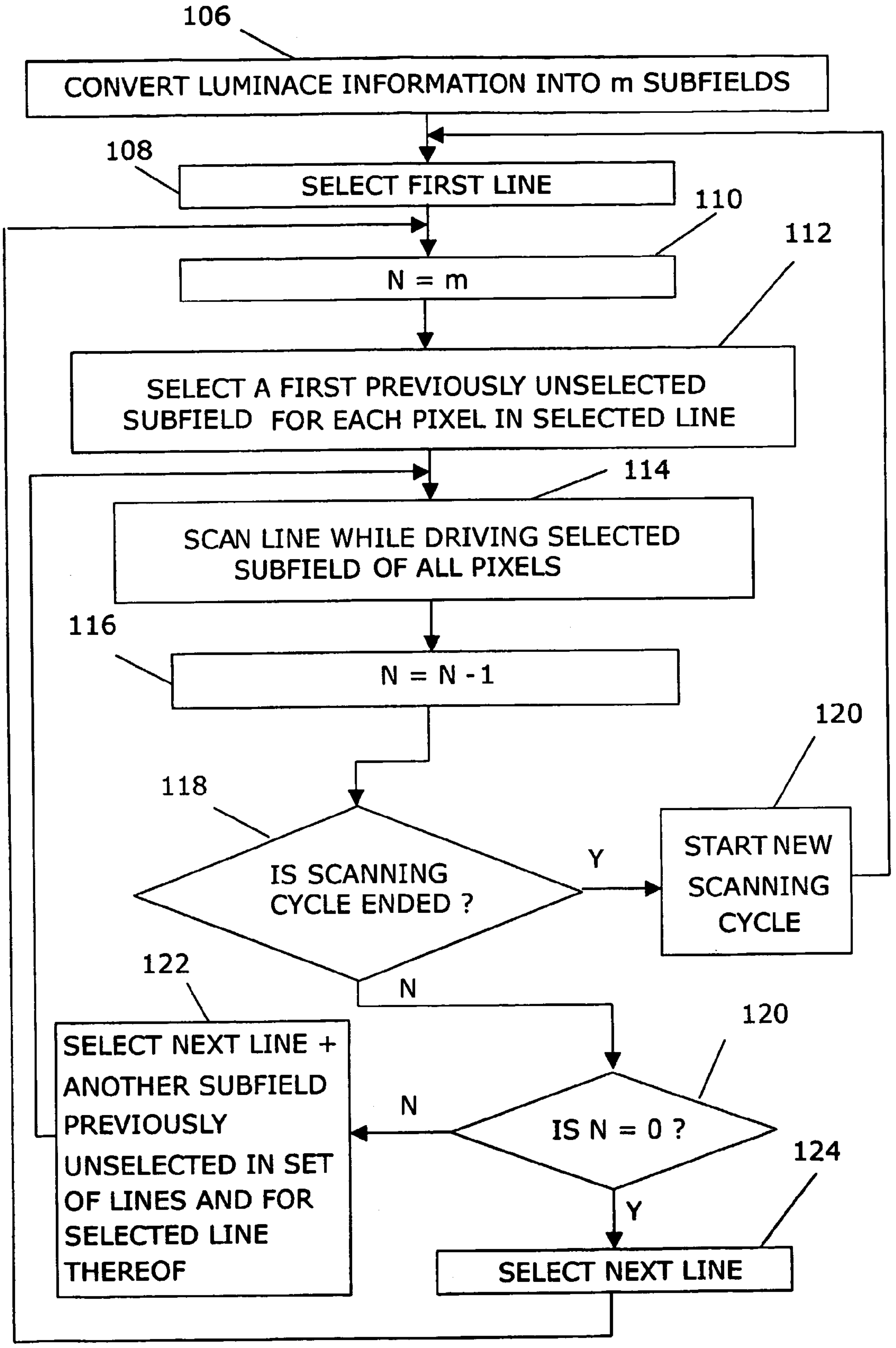

FIG. 4 shows a portable electronic device in the form of a cellular phone including a display for showing among other things video information, FIG. 5 shows a block schematic of a display unit according to the invention connected to various image sources for driving a pixel in a display, FIG. 6 shows a general frame length driving scheme for a display FIG. 7 shows a variation of an enhanced pulse width modulation driving scheme for a display, FIG. 8 shows a standard frame length driving scheme in a number of scanning cycles for a display, FIG. 9 shows an enhanced frame length driving scheme according to the invention in the same number of scanning cycles as in FIG. 8, for driving a display according to the invention, FIG. 10 shows the pulse width modulation scheme of FIG. 7 in a number of scanning cycles for the display, FIG. 11 shows an enhanced pulse width modulation driving scheme according to the invention in the same number of scanning cycles as in FIG. 10 for the display, FIG. 12 shows a standard frame rate control driving scheme in a number of scanning cycles for the display, FIG. 13 shows an enhanced frame rate control driving scheme according to the invention in the same number of scanning cycles as in FIG. 12 for the display, FIG. 14 shows a flow chart of a method of driving a display according to the invention, and FIG. 15 shows another flow chart for driving the display according to a preferred embodiment of the present invention.

Before describing the invention in more detail a few different display-driving schemes will be described in order to get a better understanding of the invention. A lot of the discussion will also be made in relation to gray level portrayal. It should however be realized that full color portrayal is applicable in line with the gray level portrayal scheme to be described in the following. The principles of the gray level scheme is then applied for the colors red blue and green.

Figure 1:
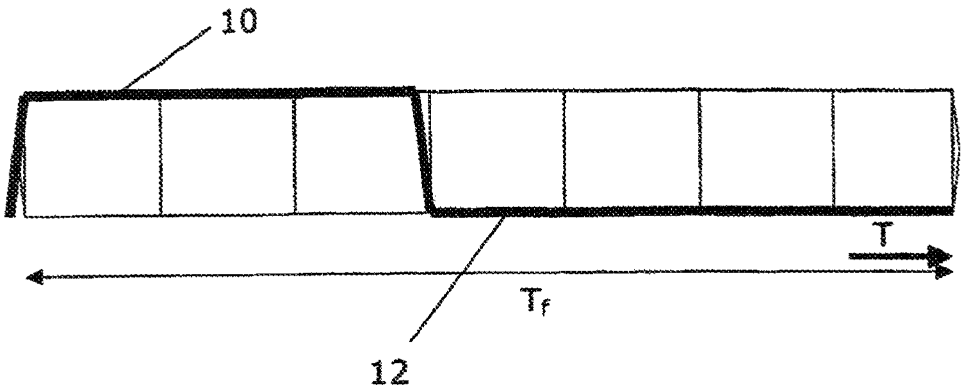
FIG. 1 (Prior Art)
FIG. 1 shows a basic pulse width modulation driving scheme for a display.

FIG. 1 shows a timing diagram for a basic gray level pulse width modulation (PWM) driving scheme for a display. In these types of schemes a pixel is driven with a root mean square (RMS) voltage during a certain time of a frame period for a pixel. A luminance level supplied to the display for the pixel then corresponds to the time the voltage is driven. In FIG. 1 it is seen that a pixel is driven during a first period 10 of the frame time $T_f$ and not driven during a second period 12 of the frame time. The timing is indicated with a thick black line having a high level during driving and a low level when a pixel is not driven. In the figure the frame time is divided into 7 different time sections, corresponding to the resolution. The pixel is thus driven during 3 out of the seven time periods, which time period corresponds to the luminance level provided. The duty cycle then determines the luminance value. This basic scheme provides one pulse for driving a display within a frame. There is thus one address cycle for a pixel during the frame. A scanning cycle is indicated in FIG. 1 with an arrow at the beginning and end of the whole set of sections. Note that only the addressed line time is depicted in the figure.

Figure 2:
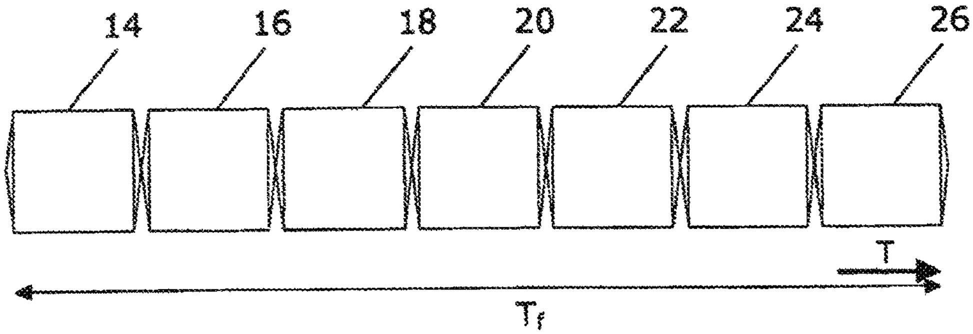
FIG. 2 (Prior Art)
FIG. 2 shows a basic frame rate driving scheme for a display.

FIG. 2 shows a basic gray level frame rate control (FRC) scheme during a frame $T_f$. Here luminance information is provided in the form of three bits, bit 0, bit 1 and bit 2, which together provide eight gray scale values. In this scheme the frame is divided into 7 different subfields of equal length. Each subfield is driven once during a frame and is therefore covered by one address cycle, which is indicated with arrows at both ends of each subfield. The subfields are according to this known scheme scanned in order from left to right during a frame $T_f$ for each consecutive scanning cycle. A subfield is either driven (on) or not driven (off). A first subfield 14 corresponds to the bit 2 of luminance information, a second subfield 16 corresponds to the bit 1 of luminance information, a third subfield 18 also corresponds to the bit 2 of luminance information, a fourth subfield 20 corresponds to the bit 0 of luminance information, a fifth subfield 22 corresponds to the bit 2 of luminance information, a sixth subfield 24 corresponds to the bit 1 of luminance information and a seventh subfield 26 corresponds to the bit 1 of luminance information. If for instance bit 2 is on, all subfields having this information will be driven, whereas none of these will be driven if the bit is off. Note that only the addressed line time is depicted in the figure.

Figure 3:
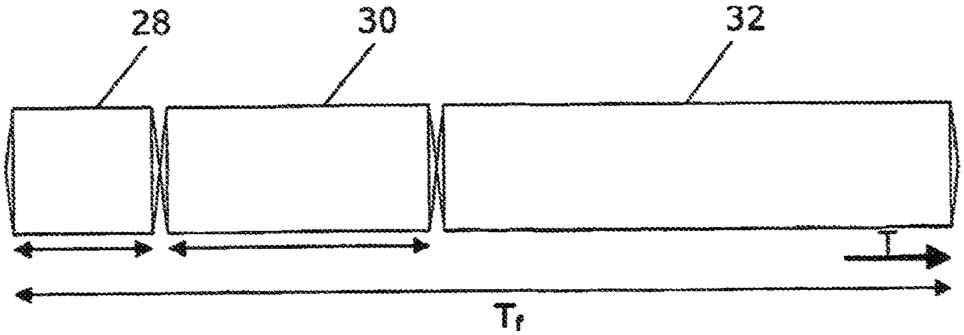
FIG. 3 (Prior Art)
FIG. 3 shows a basic frame length driving scheme for a display.

FIG. 3 shows a basic gray level frame length control (FRC) scheme in which there are only three subfields corresponding to three different bits during a frame $T_f$. Each subfield here corresponds to a bit and the length of the subfield corresponds to the importance of the bit. This scheme is better described in EP application no. 02076071.6, which is herein incorporated by reference. FIG. 3 thus shows a first subfield 28 having a certain length, a second subfield 30 having a longer length and a third subfield 32 having a third length, each provided during a separate scanning cycle. Note that only the addressed line time is depicted in the figure.

Each of these three driving schemes might give rise to flicker in a display, why the present invention is intended to solve this.

FIG. 6 shows a scheme during a frame $T_f$, which is the frame length control scheme with 6 binary weighted subfields capable of $2^3$*6 colors. For each pixel, the scheme comprises a first subfield 90, a second subfield 92 a third subfield 94, a fourth subfield 96, a fifth subfield 98, and a sixth subfield 100. The temporal relationship between the subfields can be based on for instance $T/2^n$. In this way the 6-bit luminance values can be provided as luminance information in the form of subfields driving the display. Each subfield is scanned during a scanning cycle, which is indicated by thick arrows around each subfield. Note that only the addressed line time is depicted in the figure.

FIG. 7 shows a two section division for a PWM-driving scheme. Here a first section 102 is driven followed by a second section 104. The corresponding scanning periods are shown with arrows. The driven sections can here be seen as subfields. However a larger black line shows the actual driving of the sections within the subfields. In order to minimize the switching between on and off states, the display is driven during the latter part of the first section followed by the earlier part of the second section. Note that only the addressed line time is depicted in the figure.

FIG. 4 shows a portable electronic device according to the invention in the form of a cellular phone 34 having an antenna 38, a base band module 40 and display 36. The portable electronic devices of today have more and more advanced functions, one of them being video. With these advanced functions there is a need to display information on the display of the phone like video information. It should however be understood that a cellular phone is just an example of one type of portable electronic device where there is a need for better resolution in a display. The display is in the preferred embodiment a Color Super Twisted Nematic Liquid Crystal Display (CSTN-LCD), although also other types can be used.

FIG. 5 shows a block schematic of a device for scanning 45, which is provided in the phone of FIG. 4. The device 45 is connected to a video source 42, like for instance an MPEG-4 video source, which delivers a video stream or image data. The video source can in itself have received a video stream from a network to which the phone is connected. The device 45 is also connected a data & graphics source 44, which delivers data and graphics. These sources 42, 44 are connected to a video processing unit 46 within the device 45. As can be seen from FIG. 5, the video source delivers so called 5-6-5 information, that is the colors to be presented on the screen are coded with 5, 6, and 5 bits for red, green and blue, respectively. As is also clear from the figure the data and graphics source delivers data with 3-3-2 resolution, which means that the video source delivers data of higher color resolution. These different types of streams are then processed in the video processing unit 46, which converts the 3-3-2 stream from the data and graphics source 44 to a 5-6-5 stream, by stuffing the least significant bits. This is only done in order to get uniform handling of different types of data. In the video processing unit there is also performed video processing like gamma-correction. This is normally a non-linear function $x=y^n$, which converts video data to luminance values. Here n is typically 2.4. This function can be combined with the display transmission-curve compensation. Also dithering can be used in this video processing unit.

The video processing unit 46 then submits the high-resolution luminance values (5-6-5) to a data conversion device 48, which converts the high-resolution luminance values to information suitable for driving the display. In order to do this the data conversion device 48 includes a conversion unit 56 and a control unit 58 controlling the conversion. This information is then supplied to a frame memory 49, which is controlled by a timing and control subunit 50. The timing and control subunit 50 reads out luminance information from the frame memory 49 and supplies these to a column driving unit 52 for driving the display 36. The timing and control subunit 50 also controls row drivers 54 to sequentially scan lines of the display. For each line scanned luminance information is supplied to the column driving unit such that the display 36 can be driven. The column and row driving units are thus connected to the display 36 for driving it. Previously such driving has been done such that each section or subfield is provided within the same scan for all pixels from row to row. How it is done according to the invention will be described shortly.

When a visual artifact is linked to a specific subfield, it can appear on the complete display area during that period and will repeat at the display rate. This may cause serious flicker artifacts at the frequency used, especially when the display rate is low. When the display-rate is increased the flicker will get less, however the dissipation will increase and more power will also be needed for driving the display.

Besides this artifact, there might be another artifact. If the most significant subfield is active for a rather long period, this may also cause some artifacts. When the display-rate is increased this period will also get shorter and flicker will reduce.

FIG. 8 shows the driving of a display during a number of scan cycles within a frame in a frame length control scheme. The lines in FIG. 8 are numbered from n to n+5, which is equal to the number of subfields existing in the depicted scheme. This is only done for simplicity and better understanding of the problems existing. During a first scan cycle, scan 0, all the lines are scanned sequentially with the first subfield 90. During a second scanning cycle, scan 1, all the lines are scanned sequentially with the second subfield 92. This is followed by scanning of the third subfield 94 during a third scanning cycle, scan 2, the fourth subfield 96 during a fourth scanning cycle, scan 3, the fifth subfield 98 during a fifth scanning cycle and the sixth subfield 100 during a sixth scanning cycle, which is the last scanning cycle in the frame. In the figure all the fifth 98 and sixth 100 subfields are not shown due to size limitations. It should however be realized that they are scanned during the depicted scanning cycle. A visual artifact associated with for instance the sixth subfield 100 can therefore be very disturbing because of it being repeated for all lines within a scanning cycle.

The present invention reduces the influence from the previously described artifacts without having to raise the display rate. Therefore the driving of the display according to a preferred embodiment of the invention will now be described with reference to FIGS. 5, 9 and 15. FIG. 9 shows six different scanning cycles numbered from n to n+5, in which the order of the six subfields are varied from line to line in a staggered fashion. The method described will be limited to the scans made within a frame. Only the lines n to n+5 are shown for each scan in FIG. 9, although the method is repeated for all lines of a display, which number is normally considerably larger. In this invention the enhanced frame length control scheme shown in FIG. 9 is used for driving a pixel.

First the conversion unit 56 of the data conversion device 48 converts luminance values into subfields according to the scheme depicted in FIG. 6 under the control of control unit 58, step 126. The data conversion device 48 supplies these converted subfields to the frame memory 49 in an order such that they will be scanned in varying order from line to line, step 130. The control unit 58 thus selects the scanning order for the subfields. For a preferred variation according to the invention, the subfields for pixels in line n will then have the order: first 90, second 92, third 94, fourth 96, fifth 98 and sixth 100, the subfields for pixels in line n+1 the order second 92, third 94, fourth 96, fifth 98, sixth 100 and first 90, the subfields of pixels in line n+2 the order: third 94, fourth 96, fifth 98, sixth 100, first 90 and second 92, the subfields of pixels in line n+3 the order: fourth 96, fifth 98, sixth 100, first 90, second 92 and third 94, the subfields of pixels in line n+4 the order: fifth 98, sixth 100, first 90, second 92, third 94 and fourth 96 and the subfields of pixels in line n+5 the order: sixth 100, first 90, second 92, third 94, fourth 96 and fifth 98. These above described orders are then repeated in the same fashion for all subsequent lines. Thereafter the timing and control subunit 50 selects subfields from the frame memory 49 in consecutive order and makes the row driving unit 54 scan the lines consecutively in all scanning cycles, step 132. This means that during a first scan, scan 0, all the subfields which lie first in all the above described orders are scanned for each line, followed by the subfields second in the order in scan 1 etc. until scan 5 such that all information has been scanned in the frame.

FIG. 9 more clearly shows how this scanning is performed. In the scheme the first subfield 90 is chosen for the first line during a first scan, scan 0, the second subfield 92 is chosen for the next line n+1, the third subfield 94 is chosen for the third line n+2, the fourth subfield 96 is chosen for the fourth line n+3, the fifth subfield 98 is chosen for the fifth line n+4 and the sixth subfield 100 is chosen for the sixth line n+5. This type of selection is then continued in the same fashion for all scanned lines within the display during the first scanning cycle, scan 0. During the next scanning cycle, scan 1, the second subfield 92 is chosen for line n, the third subfield 94 is chosen for line n+1, the fourth subfield 96 is chosen for line n+2, the fifth subfield 98 is chosen for line n+3, the sixth subfield 100 is chosen for line n+4 and the first subfield 90 is chosen for line n+5 etc. for all lines of the display. The subfields are shifted one position for each consecutive scan up till scan 5. In this way all the information for the pixels are provided during a frame while at the same time shifting the selection of subfield from line to line. The subfields are thus selected in a consecutive order from line to line.

An alternative way of performing the method is shown in FIG. 14. Here, the data conversion device 48 first converts the luminance values into m=six different subfields for each pixel of the display, step 106. Thereafter these subfields are all entered into the frame memory 49 in original order. The timing and control subunit 50 then selects a first line of the display to be scanned, step 108. After this the timing and control subunit 50 sets a row counter N=m, i.e. to the number of subfields used, step 110, in order to define a set of lines within which the order of subfields may be varied. Thereafter the timing and control subunit 50 selects a first previously unselected subfield for all pixels within the selected line, step 112, and supplies this subfield to the column driving unit 54 for a first line scan in a first scanning cycle, scan 0, step 114. For this first line n the first subfield 90 is driven for all pixels of the line. Then the line counter N is decreased by one, step 116. If the scanning cycle is ended, step 116, i.e. if the last line of the display had been scanned during the scanning cycle, the timing and control subunit 50 staffs a new scanning cycle, scan 1, step 120, returns to step 108 and selects a first line of this next scanning cycle, resets the line counter, step 110, and then continues with step 112 and selects another subfield which has not previously been selected for the line, step 112, and scans the line while driving the selected subfield of all pixels in the line, step 114. If the scanning cycle was not ended, step 118, a further check is made if the line counter has reached zero or not, step 120. If the line counter has reached zero, step 120, the next line is selected for scanning, step 124 and the process returns to step 110 and resets the line counter N, followed by new selection of a subfield for the next line. If however the line counter had not reached zero, step 120, the next line is selected and another subfield not used for previously selected lines within the set of lines and not previously selected for this line during an earlier scan cycle is selected, step 122. Thereafter the line is scanned while driving the pixels with the selected subfield, step 114. In this way the method continues until all lines have been scanned with varying subfields. The method thereafter continues in above described manner for consecutive frames.

The above-described scheme mixes the subfield data from line to line. In this way each address scan will take the same period of time. The actual pictures show a mixture of all the subfields. Hence it will diffuse the artefacts of all the individual subfields and flicker effects. Still each pixel is driven with exactly the same signals in time as in ordinary driving schemes. An extra advantage is that the column switching is more homogeneous and averaged over time, resulting in less cross-talk effects.

The described methods can be varied, in that another order of selection can be provided. The selection can be provided as a complete random selection with the limitations on selection set out in the flow chart of FIG. 14, i.e. a subfield can only appear once for a line during a frame and the same subfield does not appear in consecutively selected lines within a scanning cycle. Different orders than staggered are also possible. One of the many variations is to drive the first subfield for the first line, the third subfield for the second line, the fifth subfield for the third line, the second subfield for the fourth line, the fourth subfield for the fifth line and the sixth subfield for the sixth line during scan 0 followed by the order second, fourth, sixth, first third and fifth subfields during scan 1 and third, fifth, first, fourth, sixth, second subfield during scan 2 etc. Yet another possible variation is the order first, sixth, second, fifth, third, fourth subfields for scan 0 followed by the order fourth, first sixth, second fifth, and third subfields for scan 1 etc. These are just a few of the countless possible order variations that can exist. Naturally all previously described selection schemes can be controlled from either the conversion control unit or the timing and control subunit.

FIG. 10 shows a standard way of driving a display according to the pulse width modulation scheme. Because the subfield 101 is always provided in the same scanning cycle, the same problems that were associated with the standard frame length control scheme will occur. While only a single scan needs to be driven, no frame memory is required. However the field rate will be very low and image flicker will occur. When increasing the field rate, again a frame rate is required. The frame rate can be increased by doubling the field data. However the gray scale resolution can be increased when a different time base is used for the repeated address scan.

FIG. 11 shows a similar way of driving the display for the enhanced pulse width modulation scheme according to the invention for avoiding the flickering. Here a first section 102 is driven for a first line n during a first scan, scan 0. When the first section has been driven for the required time of the length of the section, driving is ended and then scanning for line n+1 is started. For line n+1 the actual driving of the section is provided in the end of the time provided for the second section in order to reduce switching on and off the driving of a line. In this way the driving is continued for all lines of the display during the first scanning cycle. In the next scanning cycle, scan 1, the opposite driving is provided in that first the second section 104 is driven for a length of time during the first part of the time provided for the second section for line n followed by the driving of the first section 104 during a latter part of the time provided for this section in line n+1, etc. for all lines within the scan cycle.

This scheme interlaces the sections from line to line. In this way each address scan will display a mixture of the two sections. Hence the artifacts of the individual sections will diffuse and flicker effects will be reduced.

For each line the column data has only one transition per scan, while the modulated pulses are combined with the pulses of the next row. This saves column switching power.

For each line the duty-cycle of PWM can have 7 values (3 bits) resulting in 64 levels per pixel. The addressing scheme will provide a more optimal driving scheme when the weight of subfields have the full accuracy for each driven line, while no extra switching (dissipation) is required.

For a frame rate control scheme there are no visual artifacts associated with differing lengths of the subfields. There might still be some flickering though because of a visual artifact linked to a specific subfield. FIG. 12 shows the standard way of driving the display according to this scheme. For simplicity the figure only contains lines n to n+6, which is equal to the number of subfields existing in the driving scheme. Here the display is first scanned with the first subfield 14 for all lines during a first scanning cycle, scan 0, then scanned with the second subfield 16 for all lines during a second scanning cycle, scan 1, thereafter scanned with the third subfield 18 for all lines during a third scanning cycle, scan 2, then scanned with the fourth subfield 20 for all lines during a fourth scanning cycle, scan 3, then scanned with the fifth subfield 22 for all lines during a fifth scanning cycle, scan 4, then scanned with the sixth subfield 24 for all lines during a sixth scanning cycle, scan 5, and finally scanned with the seventh subfield 26 for all lines during a seventh scanning cycle, scan 6.

This flicker can be reduced with a variation of the scanning from line to line according to the invention shown in FIG. 13. Here the subfields have been varied from line to line in the same manner as was done in FIG. 9. During the first scan, scan 0, line n thus scans the first subfield 14, line n+1 scans the second subfield 16, line n+2 scans the third subfield 18, line n+3 scans the fourth subfield 20, line n+4 scans the fifth subfield 24, line n+5 scans the sixth subfield 24 and line n+6 scans the seventh subfield 26. During the second scan, scan 1, line n scans the seventh subfield 26, line n+1 scans the first subfield 14, line n+2 scans the second subfield 16, line n+3 scans the third subfield 18, line n+4 scans the fourth subfield 20, line n+5 scans the fifth subfield 22 and line n+6 scans the sixth subfield 24. This is continued in the same manner as in FIG. 9 until the seventh scan, scan 6, where line n scans the second subfield 16, line n+1 scans the third subfield 18, line n+2 scans the fourth subfield 20, line n+3 scans the fifth subfield 24, line n+4 scans the sixth subfield 24, line n+5 scans the seventh subfield 26 and line n+6 scans the first subfield 14. This also thus reduces flickering. Note that the variations made to the frame length control scheme can of course also be made for this frame rate control scheme. An extra advantage is that the column switching is more homogenous and averaged over time, resulting in less cross-talk effects.

To improve on the trade-off between flicker and power, the scan frequency can be adjusted to an optimum value.

With the described system for driving a display, the amount of flicker is reduced without having to increase the speed of scanning for a given basic scheme. The scanning scheme according to the invention reduces visual image flicker, without the need for changing the display rate. While data of all subfields is displayed in a mixed way on the display, the visual image flicker, which can depend on a specific subfield, is spread over the frame-time. With this scheme a better image portrayal, low power consumption and feasible and cost-effective implementation is obtained.

When driving a LCD display module, the RMS voltage of the successive driven subfields will determine the actual luminance of a pixel. When the resulting luminance of the display is compared with the used driving codes, the actual transmission of the display can be characterised. The driving codes can be adjusted to get an optimal display performance. This characterisation needs to be done only once for a specific display type.

The control units can be implemented in the form of a microprocessor with associated program memory.

The invention can be varied in some ways. The driving scheme can also be applied with Multi Row Addressing (MRA), by grouping lines of the same weight across repeating line-sets. The display can also be a separate entity, which is not included in the device for scanning lines. The number of subfields used can also be varied in many ways.

The invention is furthermore not limited to cellular phones, but can be implemented in any type of electronic device such as palmtops, laptop computers or electronic game machines.

In the description above lines have in all cases been rows of the display. It is equally as well possible to scan columns and provide luminance information to row drivers instead.

The invention claimed is:

1. Method of scanning lines in a display within a frame, where driving luminance information provided to the display for each pixel within the frame is divided into subfields, the method including the steps of:

selecting subfields to be used when scanning lines in a set of scanning cycles equivalent to the number of subfields existing for driving the pixels, scanning the lines consecutively for the set of scanning cycles, and varying the selection of subfield from line to line in each scanning cycle such that the subfields are selected in a consecutive order from line to line as the lines are scanned consecutively, the subfields of two consecutive lines do not overlap with respect to time during each scanning cycle, no two consecutive line scans use the same subfield and no line is scanned using the same subfield twice during the set of scanning cycles, such that image flicker caused by the subfields is reduced.

2. Method according to claim 1, wherein a scan of a line includes applying an RMS voltage corresponding to a value of the subfield to a pixel.

3. Method according to claim 1, wherein the subfields have varying lengths.

4. Method according to claim 1, wherein the subfields are subframes provided according to a frame length control scheme.

5. Method according to claim 1, wherein the subfields are subframes provided according to a frame rate control scheme.

6. Method according to claim 1, wherein the subfields are provided according to a pulse width modulation scheme.

7. Method according to claim 1, wherein the subfields have varying lengths, and wherein the subfields are subframes provided according to a frame length control scheme and a frame rate control scheme.

8. Device for scanning a number of lines in a display within a frame using luminance values within a frame and comprising:

at least one conversion unit for converting received luminance values into driving luminance information including subfields, and supplying the subfields to a line driving unit, a line driving unit arranged to scan each line consecutively with the luminance information of each pixel on the display in a number of scanning cycles equivalent to the number of subfields existing for driving the pixels, and a control unit arranged to provide variation of the selection of subfield from line to line for each scanning cycle such that the subfields are selected in a consecutive order from line to line as the lines are scanned consecutively, the subfields of two consecutive lines do not overlap with respect to time during each scanning cycle, no two consecutive line scans use the same subfield and no line is scanned using the same subfield twice during the set of scanning cycles, such that image flicker caused by the different sizes of the subfields is reduced.

9. Device according to claim 8, wherein the subfields have differing lengths.

10. Device according to claim 8, wherein the subfields are provided as subframes according to a frame length control scheme.

11. Device according to claim 8, wherein the subfields are provided as subframes according to a frame rate control scheme.

12. Device according to claim 10, wherein the subfields are provided according to a pulse width modulation scheme.

13. Device according to claim 8, wherein the subfields have differing lengths, and wherein the subfields are provided as subframes according to a frame length control scheme and a frame rate control scheme.

14. Portable electronic device comprising:

a display, at least one conversion unit for converting received luminance values into driving luminance information including subfields and supplying the subfields to a line driving unit, a line driving unit arranged to scan each line consecutively with the luminance information of each pixel on the display in a number of scanning cycles equivalent to the number of subfields existing for driving the pixels, and a control unit arranged to provide variation of the selection of subfield from line to line for each scanning cycle such that the subfields are selected in a consecutive order from line to line as the lines are scanned consecutively, the subfields of two consecutive lines do not overlap with respect to time during each scanning cycle, no two consecutive line scans use the same subfield and no line is scanned using the same subfield twice during the set of scanning cycles, such that image flicker caused by the different sizes of the subfields is reduced.

* * * * *